US012465978B2

(12) United States Patent
Kasperchik et al.

(10) Patent No.: US 12,465,978 B2
(45) Date of Patent: Nov. 11, 2025

(54) INCREASING ENERGY ABSORPTION DURING ADDITIVE MANUFACTURING

(71) Applicant: Peridot Print LLC, Palo Alto, CA (US)

(72) Inventors: Vladek P. Kasperchik, Corvallis, OR (US); Emre Hiro Discekici, San Diego, CA (US); Krzysztof Nauka, Palo Alto, CA (US)

(73) Assignee: PERIDOT PRINT LLC, Palo Alto, CA (US)

( * ) Notice: Subject to any disclaimer, the term of this patent is extended or adjusted under 35 U.S.C. 154(b) by 423 days.

(21) Appl. No.: 18/020,006

(22) PCT Filed: Aug. 6, 2020

(86) PCT No.: PCT/US2020/045104
§ 371 (c)(1),
(2) Date: Feb. 6, 2023

(87) PCT Pub. No.: WO2022/031285
PCT Pub. Date: Feb. 10, 2022

(65) Prior Publication Data
US 2023/0286054 A1 Sep. 14, 2023

(51) Int. Cl.
*B22F 10/85* (2021.01)
*B22F 10/16* (2021.01)
(Continued)

(52) U.S. Cl.
CPC ............ *B22F 10/85* (2021.01); *B22F 10/16* (2021.01); *B22F 10/31* (2021.01); *B22F 12/41* (2021.01);
(Continued)

(58) Field of Classification Search
CPC .......... B22F 10/85; B22F 10/16; B22F 10/31; B22F 12/41; B22F 10/36; B22F 10/80;
(Continued)

(56) References Cited

U.S. PATENT DOCUMENTS

2016/0332380 A1* 11/2016 De Pena ............... B33Y 30/00
2017/0305066 A1  10/2017 Nauka et al.
(Continued)

FOREIGN PATENT DOCUMENTS

EP       3153305 A1   4/2017
WO    2007/114895 A2  10/2007
(Continued)

*Primary Examiner* — Michael J Brown
(74) *Attorney, Agent, or Firm* — Shook, Hardy & Bacon

(57) ABSTRACT

In one example in accordance with the present disclosure, an additive manufacturing system is described. The additive manufacturing system includes a build material distributor to deposit powder build material on a surface and an agent distribution system to selectively deposit various colored fusing agents and an ultraviolet absorbing agent on the powder build material in a pattern of a layer of a three-dimensional (3D) object to be printed. An irradiation source selectively fuses powder build material with colored fusing agent disposed thereon. The additive manufacturing system also includes a controller. The controller, per location of the layer of the 3D object to be printed 1) determines an energy absorption at the location based on an absorptivity of colored fusing agents deposited at that location and 2) determines an additive manufacturing adjustment to be made at the location to bring the energy absorption at the location to a target level.

15 Claims, 7 Drawing Sheets

(51) Int. Cl.
*B22F 10/31* (2021.01)
*B22F 12/41* (2021.01)
*B33Y 10/00* (2015.01)
B29C 64/165 (2017.01)
B29C 64/393 (2017.01)
B33Y 30/00 (2015.01)
B33Y 50/02 (2015.01)

(52) U.S. Cl.
CPC ............... *B33Y 10/00* (2014.12); *B33Y 30/00* (2014.12); *B33Y 50/02* (2014.12)

(58) Field of Classification Search
CPC ......... B33Y 10/00; B33Y 30/00; B33Y 50/02; B33Y 50/00; B29C 64/165; B29C 64/295; B29C 64/393
USPC .......................................................... 700/118
See application file for complete search history.

(56) References Cited

U.S. PATENT DOCUMENTS

| | | | |
|---|---|---|---|
| 2018/0133957 A1 | 5/2018 | Ramirez Muela et al. | |
| 2018/0326662 A1 | 11/2018 | Günther et al. | |
| 2019/0077080 A1 | 3/2019 | Zhao et al. | |
| 2019/0152134 A1 | 5/2019 | Nauka et al. | |
| 2021/0187834 A1* | 6/2021 | Hartman | B33Y 50/02 |

FOREIGN PATENT DOCUMENTS

| WO | 2016/068899 A1 | 5/2016 |
|---|---|---|
| WO | 2017/069778 A1 | 4/2017 |

\* cited by examiner

INCREASING ENERGY ABSORPTION DURING ADDITIVE MANUFACTURING

BACKGROUND

Additive manufacturing systems produce three-dimensional (3D) objects by building up layers of material. Some additive manufacturing systems are referred to as "3D printing devices" and use inkjet or other printing technology to apply some of the manufacturing materials. 3D printing devices and other additive manufacturing devices make it possible to convert a computer-aided design (CAD) model or other digital representation of an object directly into the physical object.

BRIEF DESCRIPTION OF THE DRAWINGS

The accompanying drawings illustrate various examples of the principles described herein and are part of the specification. The illustrated examples are given merely for illustration, and do not limit the scope of the claims.

FIG. 7 depicts a non-transitory machine-readable storage medium for increasing energy absorption during additive manufacturing, according to an example of the principles described herein.

Figure 1:
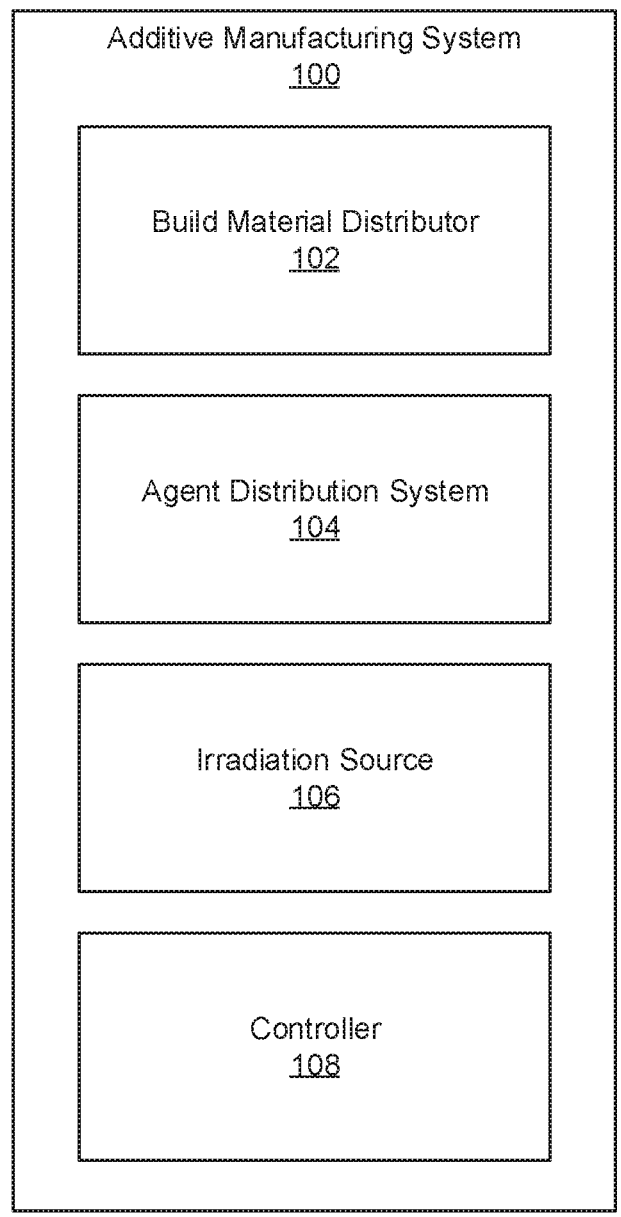
FIG. 1 is a block diagram of an additive manufacturing system for increasing energy absorption during additive manufacturing, according to an example of the principles described herein.

Throughout the drawings, identical reference numbers designate similar, but not necessarily identical, elements. The figures are not necessarily to scale, and the size of some parts may be exaggerated to more clearly illustrate the example shown. Moreover, the drawings provide examples and/or implementations consistent with the description; however, the description is not limited to the examples and/or implementations provided in the drawings.

DETAILED DESCRIPTION

Additive manufacturing systems form a three-dimensional (3D) object through the solidification of layers of build material. Additive manufacturing systems make objects based on data in a 3D model of the object generated, for example, with a computer-aided drafting (CAD) computer program product. The model data is processed into slices, each slice defining portions of a layer of build material that are to be solidified.

In one example, to form the 3D object, a build material, which may be powder, is deposited on a bed. A fusing agent is then dispensed onto portions of a layer of build material that are to be fused to form a layer of the 3D object. The system that carries out this type of additive manufacturing may be referred to as a powder and fusing agent-based system. The fusing agent disposed in the desired pattern increases the energy absorption of the layer of build material on which the agent is disposed. The build material is then exposed to energy such as electromagnetic radiation. The electromagnetic radiation may include infrared light, ultraviolet light, laser light, or other suitable electromagnetic radiation. Due to the increased heat absorption properties imparted by the fusing agent, those portions of the build material that have the fusing agent disposed thereon heat to a temperature greater than the fusing temperature for the build material.

Accordingly, as energy is applied to a surface of the build material, the build material that has received the fusing agent, and therefore has increased energy absorption characteristics, fuses while that portion of the build material that has not received the fusing agent remains in powder form. Those portions of the build material that receive the agent and thus have increased heat absorption properties may be referred to as fused portions. By comparison, the applied heat is not so great so as to increase the heat of the portions of the build material that are free of the agent to this fusing temperature. Those portions of the build material that do not receive the agent and thus do not have increased heat absorption properties may be referred to as unfused portions.

Accordingly, a predetermined amount of heat is applied to an entire bed of build material, the portions of the build material that receive the fusing agent, due to the increased heat absorption properties imparted by the fusing agent, fuse and form the object while the unfused portions of the build material are unaffected, i.e., not fused, in the presence of such application of thermal energy. This process is repeated in a layer-wise fashion to generate a 3D object. The unfused portions of material can then be separated from the fused portions, and the unfused portions recycled for subsequent 3D formation operations.

While such additive manufacturing operations have greatly expanded manufacturing and development possibilities, further development may make 3D printing applicable in even more industries. For example, in fusing-agent based additive manufacturing operations, halogen lamps emitting light over a broad spectrum, spanning the near infrared and visible spectrums, may be used to apply heat to the bed to selectively harden portions of the build material with fusing agent deposited thereon. Accordingly, carbon black ink may be used as the fusing agent to absorb light over a broad spectrum to generate enough heat to effectively harden the patterned build material. The use of black ink, however, may dictate that the color of the manufactured objects is black or grey.

In some cases, broad range radiation can be absorbed by the fusing agent-coated regions and to a lesser degree by the areas free of the fusing agent. The ratio of energies absorbed in these regions and normalized to a unit area may be used to define process selectivity which describes the ability to fuse fusing agent-coated areas without excessive heating of the agent-free regions. High selectivity is desired in order to achieve well defined, strong printed parts without degrading surrounding powder.

Accordingly, the present specification describes an additive manufacturing system that can produce colored objects, and in some examples, multi-colored objects. However, a broad band irradiation source itself may be inadequate for heating build material patterned with colored fusing agents. Specifically, just a portion of the light emitted by the broad band irradiation source may fall within the band of wavelengths where high absorption occurs for a particular colored fusing agent. Accordingly, the amount of absorbed radiative energy may be inadequate to heat the patterned build material to a fusing temperature. Furthermore, parts having different hues of the same color may differ in terms of completeness of the fusing. That is, each colored fusing agent may have a unique wavelength where absorption results in fused material, and a broad generic irradiation source may not provide the wavelengths to activate each different colored fusing agents.

Accordingly, the present specification describes using an irradiation source that ensures each colored fusing agent facilitates fusing of the build material disposed thereunder. In one specific example, the additive manufacturing system includes narrow band irradiation sources matching the absorption of subtractive colorants acting as fusing agents. For example, a magenta colored fusing agent may be selectively heated and fused with a green light source, a yellow colored fusing agent may be selectively heated and fused with a blue light source, and a blue colored fusing agent may be selectively heated and fused with a red light source. Moreover, areas free of the specific colorant may weakly absorb the corresponding monochromatic illumination.

However, it may still be the case that such narrow band irradiation sources result in non-uniformities of thermal absorption which may affect build material fusing. That is, the ability to efficiently fuse color-patterned build powder may depend on irradiation intensity, distribution density of colored fusing agents within the build material absorbing the incoming radiation, and the ability of individual colored moieties to absorb visible radiation and transform it into heat. As a specific numeric example, it may be the case that even with heavily-colored build material, an irradiation flux of at least 5 to 10 watts per square centimeter (W/cm$^2$) may be desired to achieve powder fusing in the short time allowed by the additive manufacturing process and that just certain irradiation sources can provide this degree of irradiation. Longer irradiation times may be used in cases of lightly colored build material. An array of light-emitting diodes (LEDs) of the different colors may be able to provide the desired irradiation levels, however, due to the physical properties of the light source building material, the highest energies provided by irradiation sources may differ. For example, blue and yellow LEDs may be capable of generating higher irradiation intensities while green LEDs provide lower irradiation intensities. These differences may lead to system challenges for achieving uniform fusing throughout the additive manufacturing process.

For example, Table 1 presented below indicates a calculation of the relative radiative heating coefficient, i.e. area normalized numbers describing the amount of heat that chromophore moieties are capable to produce by absorbing all incoming R-G-B-UV radiation.

TABLE 1

| Cyan/630 nm LED | Magenta/525 nm LED | Yellow/450 nm LED | UV absorber/365 nm LED |
| --- | --- | --- | --- |
| 15.886 | 11.793 | 24.311 | 20.352 |

Differences between these numbers may be based on differences in the light generation processes related to different semiconductor characteristics of LED materials. These differences mean that fusing capabilities will differ. For example, a properly fused blue region may be accompanied by poorly fused magenta region. Such non-uniformity and/or insufficient fusing may lead to dimensional inaccuracy and/or reduced mechanical strength in the 3D printed object among others.

The present specification addresses these and other issues by applying an additional, UV-absorbing, colorless fusing agent in amounts that compensate for differences in heating between areas of different color intensities within a 3D printed object. Various colorless moieties can be formulated into printable agents and can be subsequently irradiated with the appropriate UV source, such as a semiconductor laser or LED to ensure localized heating. That is, the present specification provides a solution to challenges associated with achieving multicolor 3D printed objects which results in objects with high color gamut and more efficient fusing selectivity. Specifically, the present specification produces multicolored 3D printed objects using the optical radiation absorptivity of visible dye-based colorants in combination with that of colorless UV absorbing agents as a fusing agent system to enable the production of 3D colored parts with high control over thermal uniformity.

Specifically, the present specification describes an additive manufacturing system. The additive manufacturing system includes a build material distributor to deposit powder build material on a surface and an agent distribution system to selectively deposit various colored fusing agents and an ultraviolet (UV) absorbing agent on the powder build material in a pattern of a layer of a three-dimensional (3D) object to be printed. An irradiation source selectively fuses powder build material with colored fusing agent disposed thereon. The additive manufacturing system also includes a controller. The controller, per location of the layer of the 3D object to be printed 1) determines an energy absorption at the location based on an absorptivity of colored fusing agents deposited at that location and 2) determines an additive manufacturing adjustment to be made to bring the energy absorption at the location to a target level.

The present specification also describes a method. According to the method, it is determined, per location of a layer of a 3D object to be printed, colored fusing agents to be deposited at that location. An energy absorption of the build material at the location is also determined, based on an absorptivity of the colored fusing agents to be deposited at that location. An additive manufacturing adjustment to be made at that location is also determined based on the energy absorption of the build material at that location. The 3D object to be printed is then formed by depositing the colored fusing agents, depositing UV absorbing agent based on the overall absorptivity, and irradiating the colored fusing agents and UV absorbing agent with the appropriate sources emitting visible mono-colored and UV light to fuse portions of the powder build material that include the colored fusing agents.

The present specification also describes a non-transitory machine-readable storage medium encoded with instructions executable by a processor. The machine-readable storage medium includes instructions to, when executed by the processor and per layer of a multi-layer three-dimensional (3D) object to be printed 1) determine, per location, an energy absorption at that location based on the absorptivity of the colored fusing agents to be deposited at that location, 2) determine an additive manufacturing adjustment to be made at the location to bring the energy absorption at the location to a target level, and 3) form the 3D object to be printed. The 3D object to be printed is formed by depositing UV absorbing agent based on the determined adjustment, depositing the colored fusing agents, selectively activating sets of irradiating elements based on locations where uniquely matched colored fusing agents are deposited, and selectively activating a UV energy source based on locations where the UV absorbing agent is deposited.

Such systems and methods 1) print multicolored 3D objects with high color saturation and gamut; 2) provides additional control, via colorless UV absorbing agent, to tune thermal behavior during the additive manufacturing process; 3) enhances fusing selectivity by coupling LEDs to corresponding visible colored fusing agents; and 4) provides stronger structural properties of 3D printed objects. However, it is contemplated that the systems and methods disclosed herein may address other matters and deficiencies in a number of technical areas.

Turning now to the figures, FIG. 1 is a block diagram of an additive manufacturing system (100) for increasing energy absorption during additive manufacturing, according to an example of the principles described herein. As described above, a controller (108) determines an amount of colored fusing agent to be added to a location of a powder bed of the additive manufacturing system (100). The controller (108) determines an amount of UV absorbing agent to be added to the location based on the amount of colored fusing agent and a radiative heating coefficient/efficiency of the colored fusing agent. The controller (108) applies the determined amounts of colored fusing agent and UV absorbing agent and applies heat to the agents and powder bed.

As a specific example, a 3D printed object may have three different regions, each to be a different color. The first region may have a first colored fusing agent that has a first energy absorption value, while the second region has a second colored fusing agent with a second energy absorption value less than the first value, and a third region has a third colored fusing agent that has a third energy absorption value that is less than both the first value and the second value. In this example, the additive manufacturing system (100) may supply a colorless UV absorbing agent applied to the different regions in different amounts such that the energy absorbed in both the second and third regions matches, or is closer to, that which is in the first region.

Accordingly, the additive manufacturing system (100) may include a build material distributor (102) to deposit powder build material on a surface. This powder build material may be the raw material from which a 3D object is formed. That is, portions of the powder build material that have a fusing agent disposed thereon may, in the presence of heat, fuse together to form a solid structure. The build material distributor (102) may acquire build material from a build material supply receptacle and deposit the acquired material as a layer in a bed, which layer may be deposited on top of other layers of build material already processed that reside in the bed.

The additive manufacturing system (100) also includes an agent distribution system (104) to selectively deposit various colored fusing agents and an ultraviolet (UV) absorbing agent on the powder build material in a pattern of a layer of a 3D object to be printed. That is, as described above, a 3D object is printed by a layer-wise hardening of slices of the 3D object. That is, within a build area, portions of the powder are to be fused together. The fused portions form a layer, or slice, of a 3D object. The agent distribution system (104) does so by depositing at least one agent onto a layer of powdered build material. The agent distributor (104) may distribute a variety of agents. One specific example of an agent is a fusing agent, which increases the energy absorption of portions of the build material that receive the fusing agent to selectively solidify portions of a layer of powdered build material. As described above, different fusing agents, and more specifically colored fusing agents may be deposited. These colored fusing agents allow for colored, and in some examples multi-colored, 3D objects to be printed. Such colored fusing agents may include cyan, yellow, and magenta.

Figure 4:
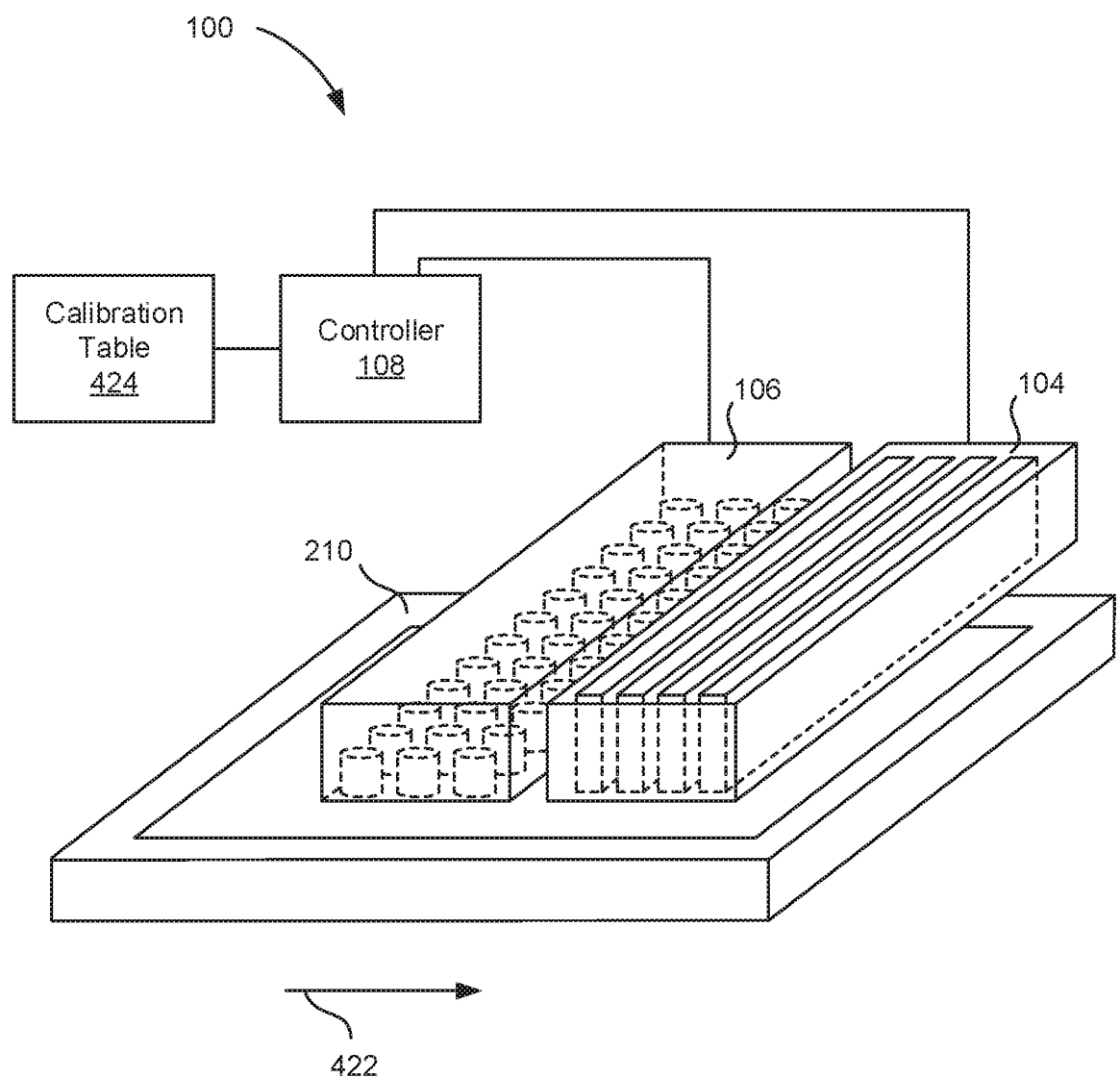
FIG. 4 is an isometric view of an additive manufacturing system for increasing energy absorption during additive manufacturing, according to an example of the principles described herein.

These colored fusing agents include an energy absorbing component to absorb light to generate heat that sinters, melts or otherwise coalesces the build material. The rate of energy absorption varies across the electromagnetic spectrum based on the characteristics of the energy absorbing component. For example, a yellow colored fusing agent may have a peak energy absorption at about 450 nanometer (nm) wavelength. A cyan colored fusing agent, by contrast, may have a peak energy absorption at about 700 (nm) wavelength. As depicted in FIG. 4 below, the agent distribution system (100) may include different printheads, each to deposit a different colored fusing agent. Thus, a multi-colored 3D object may be printed.

The agent distribution system (104) deposits an additional agent. Specifically, to increase the energy absorption of the areas on which a colored fusing agent is deposited such that those areas are heated sufficiently to fuse, the agent distribution system (104) may selectively deposit a UV absorbing agent on the powder build material. As described above, the UV absorbing agent may be colorless such that it does not alter the coloration of the 3D printed object from an intended coloration.

The amount of UV absorbing agent deposited may vary across the layer being formed and may be based on a variety of characteristics including an absorptivity of the colored fusing agent with respect to the corresponding visible monocolored illumination. That is, returning to the above example, a magenta colored fusing agent may absorb less heat than a cyan colored fusing agent. Accordingly, more UV absorbing agent may be deposited on the magenta colored regions than the UV absorbing agent deposited on the cyan colored regions. The amount of UV absorbing agent deposited on each may be such that the overall energy absorption at each location is a target value and/or equal to other regions of the layer. The controller (108) described below may provide the determination as to how much UV absorbing agent to deposit. Accordingly, the UV absorbing agent provides additional, and selective heating of the build material based at least on the colored fusing agent deposited thereon.

The amount of UV absorbing agent may also be based on other criteria. For example, as described above, there may be variation between the irradiating intensities of different colored LED elements. For example, blue and yellow LEDs may be capable of generating higher irradiation intensities while green LEDs provide lower irradiation intensities. Accordingly, in this example, the controller (108) may determine an energy absorption at a location based on the colored fusing agent deposited at that location and also on spectral emission characteristics of the irradiating source. In this example, the controller (108) may deposit more UV absorbing agent at those locations where an associated LED provides less irradiating intensity.

In some examples, the UV absorbing agent may be deposited separately from the colored fusing agents. That is, as described below in examples, the UV absorbing agent may be deposited either before or after the colored fusing agents. However, in other examples, the UV absorbing agent is included with each colored fusing agent as a single compound in an amount to increase the total amount of absorbed energy to a target level. That is, a computing device may determine the energy absorption properties of a particular colored fusing agent, energy absorption properties of a colorless UV absorbing agent, and a desired energy absorption value. Accordingly, the computing device may add an amount of UV absorbing agent to bring the energy absorption value by the colored fusing agent/UV absorbing agent mixture to the desired energy absorption value. Doing so may reduce the number of printheads on the additive manufacturing system (100) as there is not a separate UV absorbing agent printhead.

In some examples, the UV absorbing agent may be an organic compound or an inorganic compound. As a specific example, the UV absorbing agent may include diaryl and triarylmethane dyes, UV-absorbing porphyrins such as porphyrin cobalt, nitro dyes, azo-dyes such as dimethylaminobenzene and azobenzene, carbonyl dyes, and UV brighteners.

In some examples, an agent distribution system (104) includes at least one liquid ejection device to distribute the agents onto the layers of build material. A liquid ejection device may include at least one printhead (e.g., a thermal ejection based printhead, a piezoelectric ejection based printhead, etc.). In some examples, the agent distribution system (104) is coupled to a scanning carriage, and the scanning carriage moves along a scanning axis over a bed. In one example, printheads that are used in inkjet printing devices may be used in the agent distribution system (104). In this example, the fusing agent may be a printing liquid. In other examples, an agent distribution system (104) may include other types of liquid ejection devices that selectively eject small volumes of liquid.

The additive manufacturing system (100) also includes an irradiation source (106) to selectively fuse powder build material with colored fusing agent disposed thereon. That is, as described above, the energy from the irradiation source (106) heats the powder build material in the bed. That powder build material with fusing agent disposed thereon absorbs enough energy, on account of the absorptivity of the colored fusing agent, such that the underlying powder build material particles fuse together to form the slice of the 3D printed object.

The irradiation source (106) may take a variety of forms. For example, the irradiation source (106) may include a single illumination source to heat all colored fusing agents simultaneously. In this example, the single illumination source may be a high intensity wide band white illumination source such as a halogen lamp or other gas discharge lamp. This white wide band illumination source may be used to heat all colors. As each colored fusing agent has different absorptivity properties, the amount of UV absorbing agent deposited may account for the differences in absorptivity of the colored fusing agents and the uniformity of build material heating by the single illumination source.

In another example, the irradiation source (106) includes a set of irradiating elements, each set to emit energy at a wavelength uniquely matched to a deposited light-absorbing agent. For example, as red LED may be used to irradiate a cyan colored fusing agent, a green LED may be used to irradiate a magenta colored fusing agent, and a blue LED may be used to irradiate a yellow colored fusing agent. In this example, the blue LED may have a wavelength 440 nanometers (nm) and 485 nm, the green LED may have a wavelength frequency of between 500 nm and 565 nm, and the red LED may have a wavelength frequency of between 620 nm and 750 nm.

Note that in this example, each set, i.e., irradiating elements of a particular color, may be activated when passing over a location where a respective colored fusing agent is deposited. That is, the red LEDs may be activated just when they pass over regions of the build area that have received cyan colored fusing agent. Accordingly, during a pass of a carriage holding the multiple sets of irradiating elements over the build area, the individual irradiating elements may turn on and off depending on the colored fusing agent pattern.

In either case, i.e., an irradiation source (106) of sets of color-specific irradiating elements or a single illumination source, the irradiation source (106) may include a UV energy source to activate the UV absorbing agent.

In some examples, UV absorbing agents are selected to be colorless, i.e. not to interfere with the desired visible color of the printed object. The UV energy source may be selected to match the absorption range of the UV absorbing agent. Similarly, the UV energy source is selected to emit UV wavelength(s) that may be minimally absorbed by the colored agent-free build material.

The UV energy source may be activated when over those parts of the build area where the UV absorbing agent is deposited. In some examples, the UV energy source is an array of UV light-emitting diodes (LEDs). The UV LEDs may be individually controllable such that selective operation of each LED, or group of LEDs, may allow for localized UV absorbing agent activation. For example, in order to reduce energy use, while passing the irradiation source over the powder bed, rather than irradiating the entire bed's length, a subset of the UV LEDs could be activated, which subset correspond to an area of the build area that receives fusing agent and/or UV absorbing agent. In some examples, the UV energy source may emit energy with a wavelength in the range of 360 nm to 410 nm.

The additive manufacturing system (100) may also include a controller (108). The controller, per location of the layer of the 3D object to be printed 1) determines an energy absorption and a corresponding temperature increase at the location based on an absorptivity of colored fusing agents deposited at that location and irradiation duration and 2) increases the energy dose delivered to the location by either increasing UV absorbing agent concentration during printing and/or by increasing UV intensity while irradiating to bring the overall energy absorption at the location to a target value.

The controller (108) may include various hardware components, which may include a processor and memory. The processor may include the hardware architecture to retrieve executable code from the memory and execute the executable code. As specific examples, the controller (108) as described herein may include a computer readable storage medium, a computer readable storage medium and a processor, an application specific integrated circuit (ASIC), a semiconductor-based microprocessor, a central processing unit (CPU), and a field-programmable gate array (FPGA), and/or other hardware device.

The memory may include a computer-readable storage medium, which computer-readable storage medium may contain, or store computer usable program code for use by or in connection with an instruction execution system, apparatus, or device. The memory may take many types of memory including volatile and non-volatile memory. For example, the memory may include Random Access Memory (RAM), Read Only Memory (ROM), optical memory disks, and magnetic disks, among others. The executable code may, when executed by the controller (108), cause the controller (108) to implement at least the functionality of increasing light absorption in colored fusing agents as described below.

First, the controller (106) determines the energy absorption and the corresponding temperature increase at the location based on an absorptivity of colored fusing agents deposited at that location and the planned irradiation intensity and duration. That is, as described above and as indicated in Table 1, the controller (106) may know the absorption of each colored fusing agent and may also have a predetermined target absorption value stored. Based on this information, the controller (106), knowing the energy absorption of UV absorbing agent, may determine how much UV absorbing agent to add at that location in order to bring the energy absorption, and the corresponding temperature increase, towards the target value. As described above, this may be done per location of the layer such that each location has an energy absorption that matches the target value. In some examples, there may be multiple colored fusing agents deposited at a given location. In this example, the controller (106) determines the energy absorption at that location based on all colored fusing agents deposited at that location and determines an amount of UV absorbing agent to deposit at that location to bring it to the target value, which target value may represent uniform energy absorbed/temperature increase across the surface of the layer. In some examples, the determination of overall energy absorption may be on a pixel-by-pixel resolution.

Based on the determined energy absorption, the controller (108) may determine an additive manufacturing adjustment to make at that location to bring the amount of absorbed radiation energy at the location to the target level.

This may be done in a number of ways. For example, the controller (108) may select a dosage of the UV absorbing agent which will increase the energy absorption at the location to the target level. As described above, the amount of UV absorbing agent to deposit may be based on the colored fusing agent(s) deposited at that location as well as the spectral emission characteristics of the irradiation source (106).

In another example, the controller (108) selects the irradiation dose, determined by UV irradiation intensity and duration, at the location to set the energy absorption and/or thermal heating at the location to the target value. Again, the UV energy source dose may be based on the colored fusing agent(s) deposited at that location as well as the spectral emission characteristics of the irradiation source (106) and the operation speed of the printer.

In some examples, both components, i.e., UV absorbing agent deposition and UV energy source irradiation dose, may be controlled. That is, both may represent tunable parameters that could be adjusted to result in a desired energy absorption and surface heating.

In general, the controller (108) knows how much, how many, and which colored fusing agents are deposited at a particular location. From this information, the controller (108) determines how much heat will be generated at that location and calculates how much more heat should be generated to ensure fusing. Knowing how much the UV absorbing agent absorbs and the spectral emission characteristics of the irradiation source (106), the controller (108) can then select the 1) the amount of UV absorbing agent to deposit, 2) the irradiation intensity of the UV energy source; 3) the duration of irradiation, or 4) any combination thereof to bring overall energy absorption to a target value where uniform and full fusing occurs. That is, the controller (108) may, with inputs including spectral emission density of an irradiation source, absorptivity and heat capacity of patterned material, and printer operating parameters adjust radiation intensity, length of irradiation and local density of UV-absorbing agent in order to equalize absorbed energy density across the patterned area.

Figure 2:
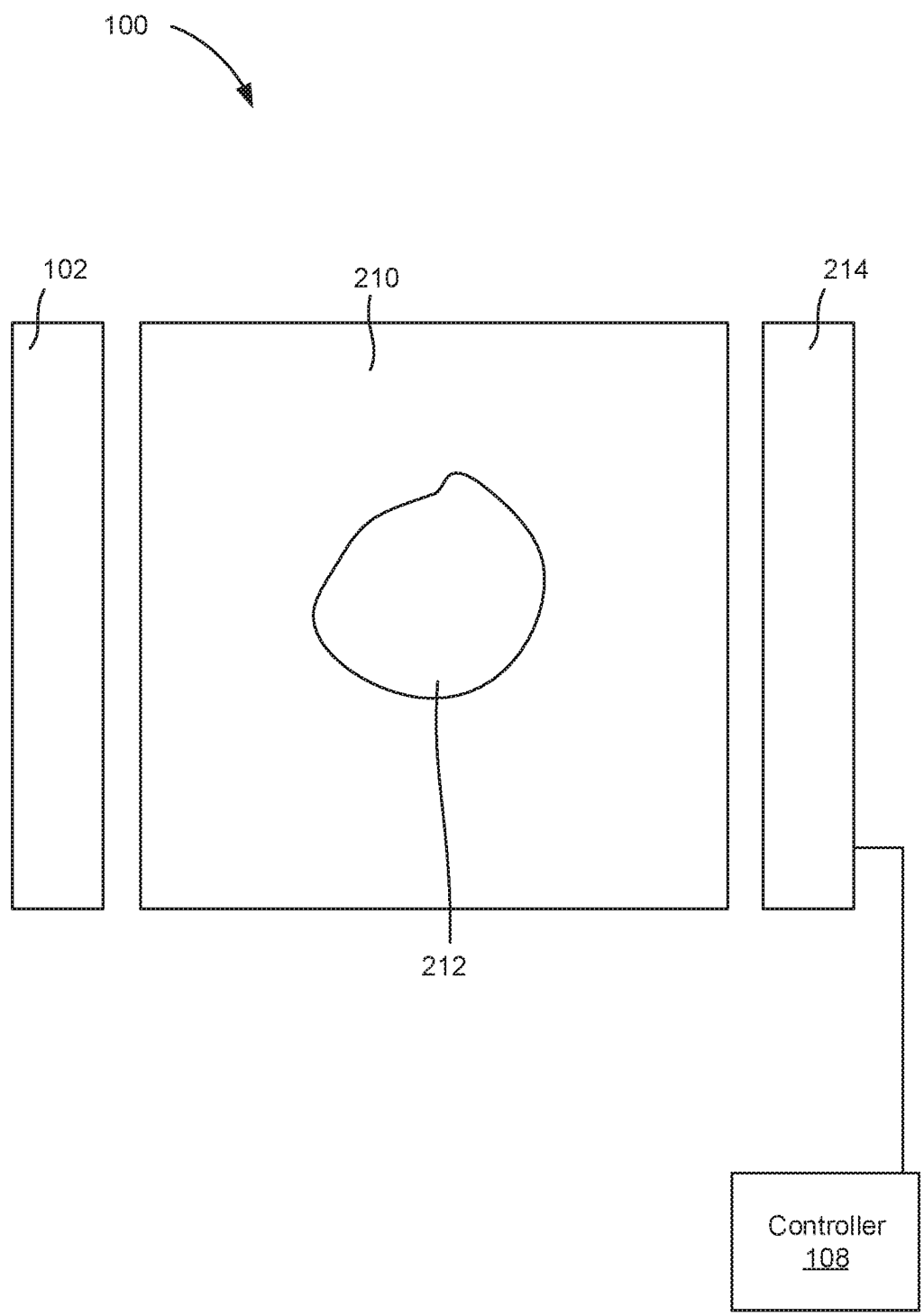
FIG. 2 is a simplified top view of an additive manufacturing system for increasing energy absorption during additive manufacturing, according to an example of the principles described herein.

FIG. 2 is a simplified top view of an additive manufacturing system (100) for increasing energy absorption during additive manufacturing, according to an example of the principles described herein. In an example of an additive manufacturing process, a layer of build material may be formed in a build area. As used in the present specification and in the appended claims, the term "build area" refers to an area of space wherein the 3D object (212) is formed. The build area may refer to a space bounded by a bed (210). The build area may be defined as a three-dimensional space in which the additive manufacturing system (100) can fabricate, produce, or otherwise generate a 3D object (212). That is, the build area may occupy a three-dimensional space on top of the bed (210) surface. In one example, the width and length of the build area can be the width and the length of bed (210) and the height of the build area can be the extent to which bed (210) can be moved in the z direction. Although not shown, an actuator, such as a piston, can control the vertical position of bed (210).

The bed (210) may accommodate any number of layers of metal powder build material. For example, the bed (210) may accommodate up to 4,000 layers or more. In an example, a number of build material supply receptacles may be positioned alongside the bed (210). Such build material supply receptacles source the build material that is placed on the bed (210) in a layer-by-layer fashion.

In the additive manufacturing process, colored fusing agents are deposited on the layer of build material that facilitates the fusing of the powder build material particles together. In this specific example, the colored fusing agents may be selectively distributed on the layer of build material in a pattern of a layer of a 3D object (212).

FIG. 2 clearly depicts the build material distributor (102). As described above, the build material distributor (102) may acquire build material from a build material supply receptacle and may deposit the material as a layer in the bed (210), which layer may be deposited on top of other layers of build material already processed that reside in the bed (210).

In some examples, the build material distributor (102) may be coupled to a scanning carriage. In operation, the build material distributor (102) places build material in the bed (210) as the scanning carriage moves over the bed (210) along the scanning axis.

FIG. 2 also depicts a carriage (214) on which the irradiation source (FIG. 1, 106) and the agent distribution system (FIG. 1, 104) are disposed. That is, in some examples, the irradiation source (FIG. 1, 106) is mobile over the bed (210). While the carriage (208) is moving, printheads (528) of the agent distribution system (FIG. 1, 104) may be activated to eject a binding agent (526) on the metal powder build material (524).

In other examples, the carriage (214) may include just the agent distribution system (FIG. 1, 104). In this example, the irradiation source (FIG. 1, 106) may be immobile or on another carriage.

FIG. 2 also depicts a controller (108) which may determine the overall energy absorption at each location of each layer of the 3D printed object (212) and may increase energy absorption by controlling at least one of a UV absorbing agent deposition, UV energy source intensity, and duration of irradiation.

The controller (108) also controls the additive manufacturing. Specifically, in a fusing agent-based system, the controller (108) may direct a build material distributor (102) to add a layer of build material. Further, the controller (108) may send instructions to direct a printhead of an agent distributor to selectively deposit the agent(s) onto the surface of a layer of the build material. The controller (108) may also direct the printhead to eject the agent(s) at specific locations to form a 3D printed object slice.

Figure 3:
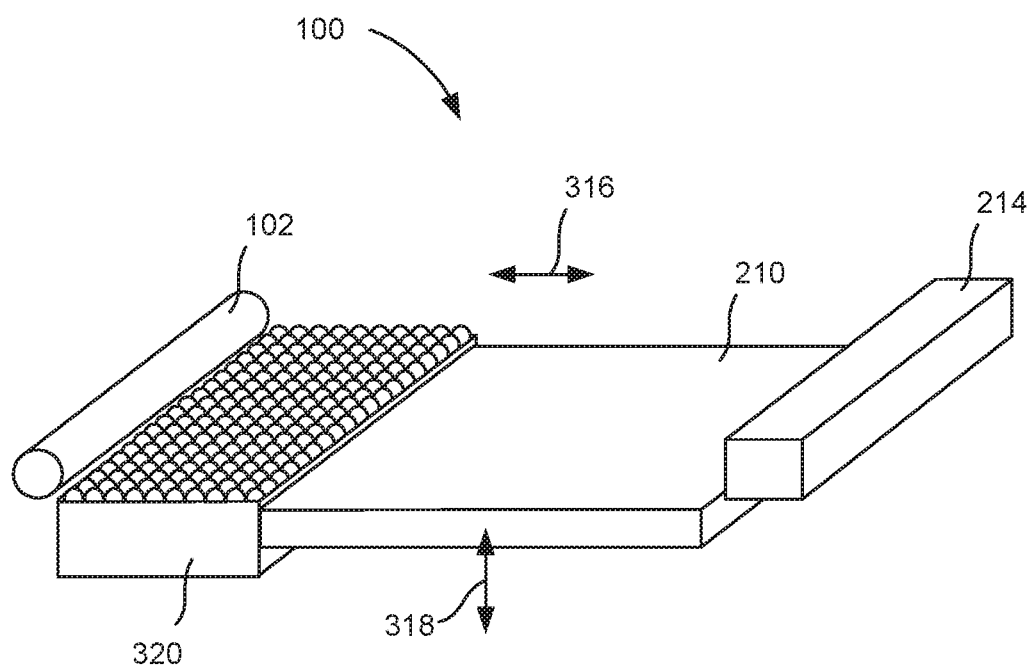
FIG. 3 is an isometric view of an additive manufacturing system for increasing energy absorption during additive manufacturing, according to an example of the principles described herein.

FIG. 3 is an isometric view of an additive manufacturing system (100) for increasing energy absorption during additive manufacturing, according to an example of the principles described herein. Components of the additive manufacturing system (100) depicted in FIG. 3 may not be drawn to scale and thus, the additive manufacturing system (100) may have a different size and/or configuration other than as shown therein.

FIG. 3 clearly depicts the bed (210) which receives the powder build material from the build material supply receptacle (320). In some examples, the bed (210) may be moved in a direction as denoted by the arrow (318), e.g., along the z-axis, so that powder build material may be delivered to the bed (210) or to a previously formed layer of metal powder build material. For each subsequent layer of powder build material to be delivered, the bed (210) may be lowered so that the build material distributor (102) can push the powder build material particles onto the bed (210) to form a layer of the powder build material thereon.

The build material supply receptacle (320) may be a container, bed, or other surface that is to position the powder build material particles between the build material distributor (102) and the bed (210). In some examples, the build material supply receptacle (320) may include a surface upon which the powder build material particles may be supplied, for instance, from a build material source (not shown).

As described above, the build material distributor (102) may move in a direction as denoted by the arrow (316), e.g., along the y-axis, over the build material supply receptacle (320) and across the bed (210) to spread a layer of the powder build material. The build material distributor (102) may also be returned to a position adjacent to the build material supply receptacle (320) following the spreading of the powder build material. In some examples, the build material distributor (102) may be a blade (e.g., a doctor blade), a roller, a combination of a roller and a blade, and/or any other device capable of spreading the powder build material particles over the platform (210).

FIG. 3 also depicts the carriage (214) that may be scanned across the bed (210) in the direction indicated by the arrow (316) and that may include the agent distribution system (FIG. 1, 104) and in some examples the irradiation source (FIG. 1, 106). The carriage (214) and the printheads formed thereon may extend a width of the bed (210).

Each of the previously described physical elements may be operatively connected to the controller (FIG. 1, 108). That is, the controller (FIG. 1, 108) may control the operations of the bed (210), the build material supply receptacle (320), the build material distributor (102), the carriage (214), irradiation source (FIG. 1, 106), and the agent distribution system (FIG. 1, 104).

FIG. 4 is an isometric view of an additive manufacturing system (100) for increasing energy absorption during additive manufacturing, according to an example of the principles described herein. In the example depicted in FIG. 4, the agent distribution system (104) and the illumination source (106) are disposed on different carriages which may move independently. Note that in the example depicted in FIG. 4, the carriages may move in a direction indicated by the arrow (422).

In this example, the agent distribution system (104) may include multiple printheads, each to deposit a different agent. Specifically, a first printhead may selectively deposit the UV absorbing agent and remaining printheads may each selectively deposit the colored fusing agents. Such a system may provide flexibility of adjusting the amount of deposited UV absorbing agent.

As described above, in another example, the UV absorbing agent may be pre-mixed with each colored fusing agent. As described below, in one example the UV absorbing agent is deposited before colored fusing agent. In this example, the controller (108) may know, based on a CAD file for example, what colored fusing agents are to be deposited where, and therefore determines where and how much UV absorbing agent is to be deposited at each location to generate the target light absorption value at each location.

FIG. 4 also depicts an example where the illumination source (106) includes sets of illuminating elements, each to emit energy at a wavelength uniquely matched to a deposited agent. For example, the illumination source (106) may include red LEDs to activate a cyan colored fusing agent, green LEDs to activate a magenta colored fusing agent, and blue LEDs to activate a yellow colored fusing agent. Still further, the illumination source (106) may include UV LEDs to irradiate and activate the UV absorbing agent. Note that in this example, the different LEDS are active when passing over locations where an associated agent has been deposited and are inactive when passing over locations where an associated agent has not been deposited.

In this example, the additive manufacturing system (100) further includes a calibration table (424) to determine how to adjust a UV absorbing agent deposition to promote normalized energy absorption and heating. The calibration table (424) may indicate how much deposited colored fusing agent and how much deposited UV absorbing agent result in a similar amount of heat produced. An example of such a calibration table (424), which assumes uniform irradiation, is provided in Table 2.

TABLE 2

| Same amount of heat produced when: | |
|---|---|
| Cyan Colored Fusing Agent | One pass of Cyan at 100 mg/cm$^2$ and one pass of UV absorbing agent at 51 mg/cm$^2$ |
| Magenta Colored Fusing Agent | One pass of Magenta at 100 mg/cm$^2$ and one pass of UV absorbing agent at 88 mg/cm$^2$ |
| Yellow Colored Fusing Agent | One pass of Yellow at 100 mg/cm$^2$ |

That is, Table 2 indicates a quantity of UV absorbing agent used (measured as milligrams per centimeter square) for each colored fusing agent to promote uniform heat generation results across the layer for all colored fusing agents. Note that this calibration table (424) may be specific to the irradiation source (106). That is, as described above, the characteristics of the irradiation source (106), and in the example depicted in FIG. 4 the characteristics of each individual irradiating LED element, may emit differently, and the calibration table (424) may provide for mappings based on those differences.

Figure 5:
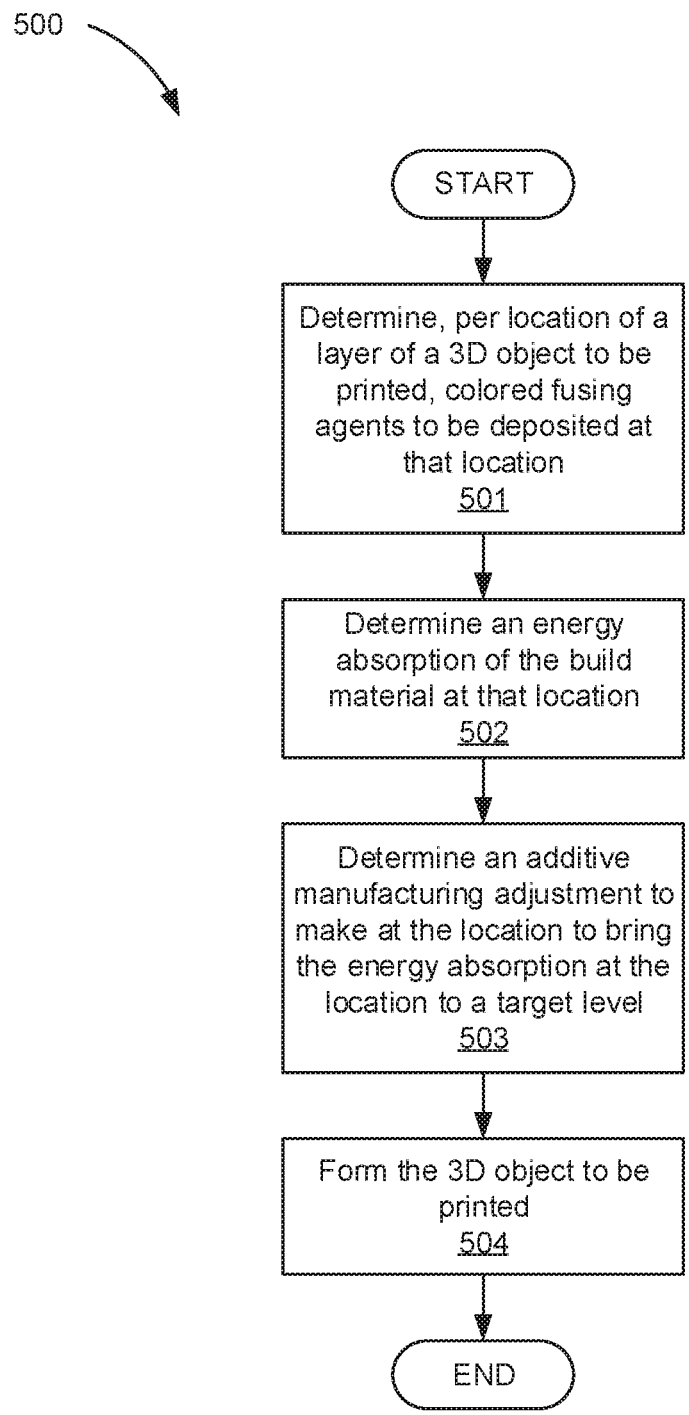
FIG. 5 is a flow chart of a method for increasing energy absorption during additive manufacturing, according to an example of the principles described herein.

FIG. 5 is a flow chart of a method (500) for increasing energy absorption during additive manufacturing, according to an example of the principles described herein. According to the method (500), it is determined (block 501), per location of a layer of a 3D object (FIG. 2, 212) to be printed, colored fusing agents to be deposited at that location. Such information may be included in a CAD file or other digital file associated with the 3D object (FIG. 2, 212) to be printed. Accordingly, the controller (FIG. 1, 108) may extract such information from such a file. Such information may be based on a pixel-by-pixel basis or groups of adjacent pixels that share similar characteristics may be grouped together. As described above, such an indication may be that there are multiple colored fusing agents deposited at a location.

According to the method (500), an energy absorption of the build material at the location is determined (block 502). Again, such determination (block 502) is per location and made for each location on a slice, and for each slice that makes up a 3D printed object (FIG. 2, 212). Accordingly, uniform energy absorption is provided across the 3D printed object (FIG. 2, 212) such that consistent fusing, and therefore geometrical accuracy, object uniformity, and object strength are promoted. As described above, such a determination (block 502) of energy absorption may be based on the colored fusing agent(s) that are deposited at each location and in some cases may be also based on the spectral emission characteristics of the irradiation source (FIG. 1, 106). Note that in the case of multiple colored fusing agents at a particular location, the controller (FIG. 1, 106) may determine (block 502) the overall energy absorption based on each colored fusing agent deposited at that location, for example by adding the absorptivity of each colored fusing agent, averaging the absorptivity, or otherwise combining the absorptivity of the colored fusing agents. For example, if a particular location includes both a cyan and a magenta colored fusing agent, the absorptivity of each colored fusing agent may be determined and averaged, added together or otherwise combined to determine the overall energy absorption at that location. The quantity of the UV absorbing agent and/or the irradiation intensity of the UV absorbing agent may then be determined based on the overall energy absorption at that location.

In addition to having multiple colored fusing agents at a location, a location may also be exposed to multiple energy sources. Accordingly, in addition to determining an overall energy absorption at the location, an overall emission of the multiple energy sources may be determined. In this example, the system may determine the energy absorption for each colored fusing agent based on a quantity of colored fusing agent, the colored fusing agent absorptivity, and the energy source emission. This value for multiple colored fusing agents may be added, averaged, or otherwise combined.

An additive manufacturing adjustment to be made at the location is then determined (block 503) which adjustment is to bring the energy absorption of each location to a target value. As described above, such an adjustment may take the form of determining a quantity of UV absorbing agent to deposit at the location and/or determining an irradiation intensity of a UV energy source at the location.

Note that in some examples, these operations may occur during additive manufacturing. That is, in some examples a determination (block 502) of energy absorption of locations of the 3D printed object (FIG. 2, 210) and a determination (block 503) of an additive manufacturing adjustment to be made to bring the energy absorption to a target level may occur beforehand, for example by analyzing a CAD file. In this example, calibration tables (FIG. 4, 424), describing amounts of locally deposited colorless UV-absorbing agent can be used and can be adjusted as printing progresses However, in other examples, such determinations (block 502, 503) may be made during printing, either from the CAD file or from sensor analysis of the surface of the build material. That is, the determination and adjustments may be run in "real-time" with the controller (FIG. 1, 108) adjusting the amount of UV absorbing agent depending on the amount of heat that visible colored fusing agents at a given location produce. Note also that in these examples, the determination (block 503) of the additive manufacturing adjustment may be based on information contained in a calibration table (FIG. 4, 424) such as that presented in Table 2.

The additive manufacturing system (FIG. 1, 100) may then form (block 504) the 3D object (FIG. 2, 212) to be printed which may include depositing the colored fusing agents, depositing the UV absorbing agent based on the overall energy absorption values, and irradiating the colored fusing agents and the UV absorbing agent to fuse portions of the powder build material that include the colored fusing agents.

Specifically, a powder build material is deposited on a surface. The surface may be a bed (FIG. 2, 210) or a previously deposited layer of powder build material. For example, under the direction of a controller (FIG. 1, 108), a build material distributor (FIG. 1, 102) may spread the supplied powder build material particles onto the bed (FIG. 2, 210).

With powder build material spread, colored fusing agents and a UV absorbing agent are selectively applied on portions of the powder build material that is to form a layer of a 3D object (FIG. 2, 212). As described above, the agents are applied via an agent distribution system (FIG. 1, 104). Specifically, the controller (FIG. 1, 108) may execute instructions to control the agent distribution system (FIG. 1, 104) to deposit the agents onto predetermined portion(s) of the powder build material that are to become part of a 3D printed object (FIG. 2, 212). As an example, if the 3D printed object (FIG. 2, 212) that is to be formed is to be shaped like a cube or cylinder, the agents agent may be deposited in a square pattern or a circular pattern (from a top view), respectively, on at least a portion of the layer of the powder build material particles.

Note that the order of applying colored fusing agents and the UV absorbing agent may vary. That is, in some examples, deposition of the colored fusing agents occurs before deposition of the UV absorbing agent and in other examples deposition of the UV absorbing agent occurs before deposition of the colored fusing agent. In other examples, deposition of the colored fusing agent may occur at the same time as deposition of the UV absorbing agent, either as a single fluid compound or as separate compounds ejected from different printheads.

According to the method (500), the irradiation source (FIG. 1, 106), including the UV energy source and colored-fusing activating sources, are activated to fuse the agent-laden build material. As described above, UV absorbing agent and the colored fusing agents combine in different mixtures at each location to ensure a uniform or normalized heat absorption across the surface of the layer of the 3D printed object (FIG. 2, 212).

As described above, these operations may be repeated to iteratively build up multiple patterned layers and to form the 3D object (FIG. 2, 212). For example, the controller (FIG. 1, 108) may execute instructions to cause the bed (FIG. 2, 210) to be lowered to enable the next layer of powder build material to be spread. In addition, following the lowering of the bed (FIG. 2, 210), the controller (FIG. 1, 108) may control the build material supply receptacle (FIG. 3, 320) to supply additional powder build material (e.g., through operation of an elevator, an auger, or the like) and the build material distributor (FIG. 1, 102) to form another layer of powder build material particles on top of the previously formed layer. The newly formed layer may be patterned with colored fusing agents and a UV absorbing agent and the irradiation source (FIG. 1, 106) components may be activated to fuse the build material. Accordingly, via the method (500), the additive manufacturing system (FIG. 1, 100) has a balanced fusing that applies more uniform fusing energy at each location of the printed object.

Figure 6:
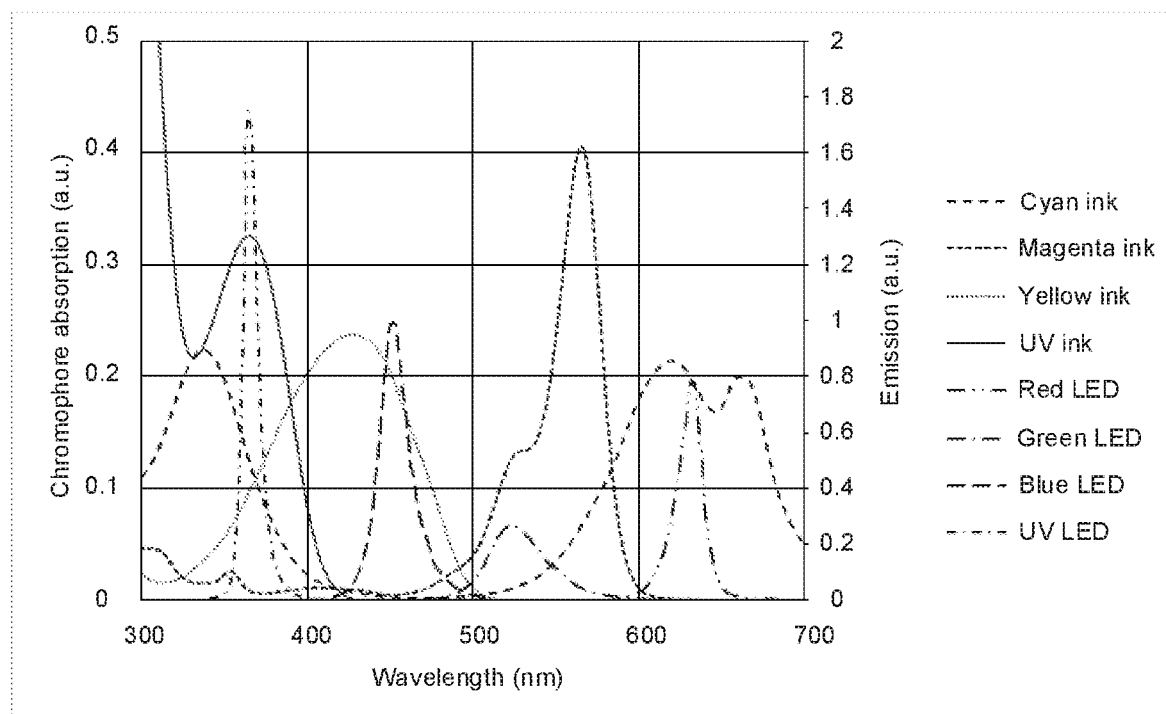
FIG. 6 depicts energy absorption of various colored fusing agents and emission of various colored lighting elements, according to an example of the principles described herein.
Figure 10:
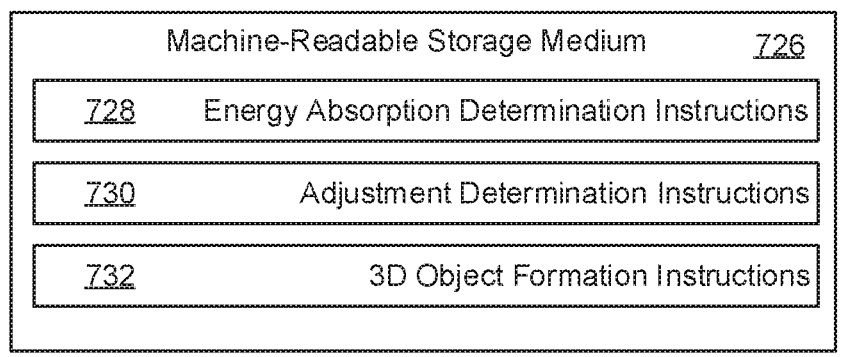

FIG. 6 depicts energy absorption of various colored fusing agents and emission of various colored lighting elements, according to an example of the principles described herein. As discussed above, FIG. 6 depicts the various peak wavelength absorptivity of each colored fusing agent as well as the peak emission wavelengths of corresponding colored LED elements. As described above, a red LED may activate a cyan colored fusing agent, a green LED may be used to activate a magenta colored fusing agent, and a blue LED may be used to activate a yellow fusing agent. FIG. 6 also depicts the energy absorption the UV absorbing agent and the peak emission wavelength of the UV energy source.

FIG. 7 depicts a non-transitory machine-readable storage medium (726) for increasing energy absorption during additive manufacturing, according to an example of the principles described herein. To achieve its desired functionality, a controller (FIG. 1, 108) includes various hardware components. Specifically, a controller (FIG. 1, 108) includes a processor and a machine-readable storage medium (726). The machine-readable storage medium (726) is communicatively coupled to the processor. The machine-readable storage medium (726) includes a number of instructions (728, 730, 732) for performing a designated function. The machine-readable storage medium (726) causes the processor to execute the designated function of the instructions (728, 730, 732). The machine-readable storage medium (726) can store data, programs, instructions, or any other machine-readable data that can be utilized to operate the additive manufacturing system (FIG. 1, 100). Machine-readable storage medium (726) can store computer readable instructions that the processor of the controller (FIG. 1, 108) can process, or execute. The machine-readable storage medium (726) can be an electronic, magnetic, optical, or other physical storage device that contains or stores executable instructions. Machine-readable storage medium (726) may be, for example, Random Access Memory (RAM), an Electrically Erasable Programmable Read-Only Memory (EEPROM), a storage device, an optical disc, etc. The machine-readable storage medium (726) may be a non-transitory machine-readable storage medium (726).

Referring to FIG. 7, energy absorption determination instructions (728), when executed by the processor, cause the processor to, per layer of a multi-layer 3D object (FIG. 2, 212) to be printed and per location on the layer, determine an energy absorption at that location based on the absorptivity of the colored fusing agents to be deposited at that location. Adjustment determination instructions (730), when executed by the processor, cause the processor to, per layer of a multi-layer 3D object (FIG. 2, 212) to be printed and per location on the layer, determine an additive manufacturing adjustment to be made at the location to bring the energy absorption at the location to a target level. 3D object formation instructions (732), when executed by the processor, cause the processor to, per layer of a multi-layer 3D object (FIG. 2, 212) to be printed and per location on the layer, form the 3D object to be printed. This may be done by depositing UV absorbing agent based on the determined adjustment, depositing the colored fusing agents, selectively activating sets of irradiating elements based on locations where uniquely matched colored fusing agents are deposited and selectively activate a UV energy source based on locations where the UV absorbing agent is deposited.

Such systems and methods 1) print multicolored 3D objects with high color saturation and gamut; 2) provides additional control, via colorless UV absorbing agent, to tune thermal behavior during the additive manufacturing process; 3) enhances fusing selectivity by coupling LEDs to corresponding visible colored fusing agents; and 4) provides stronger structural properties of 3D printed objects. However, it is contemplated that the systems and methods disclosed herein may address other matters and deficiencies in a number of technical areas.

What is claimed is:

1. An additive manufacturing system, comprising:
a build material distributor to deposit powder build material on a surface;
an agent distribution system to selectively deposit various colored fusing agents and an ultraviolet (UV) absorbing agent on the powder build material in a pattern of a layer of a three-dimensional (3D) object to be printed;
an irradiation source to selectively fuse powder build material with colored fusing agent disposed thereon; and
a controller to, per location of the layer of the 3D object to be printed:
determine an energy absorption at the location based on an absorptivity of colored fusing agents deposited at that location;
determine an additive manufacturing adjustment to be made to bring the energy absorption at the location to a target level, wherein the additive manufacturing adjustment to be made to bring the energy absorption at the location to the target level includes adjusting an amount of UV absorbing agent deposited at the location based on the determined energy absorption corresponding to the absorptivity of the colored fusing agent deposited at the location; and
form the 3D object to be printed by:
depositing, using the agent distribution system, the colored fusing agents and the UV absorbing agent on the powder build material based on the determined additive manufacturing adjustment; and
activating the irradiation source to selectively fuse the powder build material with the colored fusing agent and the UV absorbing agent disposed thereon.

2. The additive manufacturing system of claim 1, wherein the additive manufacturing adjustment is selected from the group consisting of:
depositing the UV absorbing agent in an amount to increase the energy absorption at the location to the target level; and
increasing an irradiation intensity of a UV energy source at the location to increase the energy absorption at the location to the target level.

3. The additive manufacturing system of claim 1, wherein:
the irradiation source comprises:
sets of irradiating elements, each set to emit energy at a wavelength uniquely matched to a deposited agent; and
a UV energy source to activate the UV absorbing agent; and each set of irradiating elements is selectively activated when passing over a location where a respective colored fusing agent is deposited.

4. The additive manufacturing system of claim 1, wherein the irradiation source comprises:
   a single illumination source to heat each colored fusing agent simultaneously; and
   a UV energy source to activate the UV absorbing agent.

5. The additive manufacturing system of claim 1, wherein the agent distribution system comprises:
   a first printhead to selectively deposit the UV absorbing agent; and
   a number of additional printheads to selectively deposit the various colored fusing agents.

6. The additive manufacturing system of claim 1, wherein the UV absorbing agent is included with each colored fusing agent as a single compound in an amount to increase the energy absorption of the colored fusing agent to a target level.

7. The additive manufacturing system of claim 1, wherein the energy absorption is further determined based on spectral emission characteristics of the irradiation source.

8. The additive manufacturing system of claim 1, further comprising a calibration table specific to the irradiation source to determine an amount of UV absorbing agent to deposit per colored fusing agent.

9. A method, comprising:
   determining, per location of a layer of a three-dimensional (3D) object to be printed, colored fusing agents to be deposited at that location;
   determining an energy absorption of the build material at the location based on an absorptivity of colored fusing agents to be deposited at that location;
   determine an additive manufacturing adjustment to be made at that location based on the energy absorption at that location to bring the energy absorption at the location to a target level, wherein the additive manufacturing adjustment to be made to bring the energy absorption at the location to the target level includes adjusting an amount of UV absorbing agent deposited at the location based on the determined energy absorption corresponding to the absorptivity of the colored fusing agent deposited at the location; and
   forming the 3D object to be printed by:
   depositing the colored fusing agents;
   depositing UV absorbing agent based on light absorption values; and
   irradiating the colored fusing agents and UV absorbing agent to fuse portions of the powder build material that include the colored fusing agents.

10. The method of claim 9, wherein determining an additive manufacturing adjustment to be made comprises at least one of:
   determining an amount of UV absorbing agent deposited at the location; and
   determining an irradiation intensity of a UV energy source at the location.

11. The method of claim 9, wherein deposition of the colored fusing agents occurs before deposition of the UV absorbing agent.

12. The method of claim 9, wherein deposition of the UV absorbing agent occurs before deposition of the colored fusing agents.

13. The method of claim 9, wherein determining an energy absorption at the location and determining an additive manufacturing adjustment to be made at the location to bring the energy absorption at the location to the target level occur during additive manufacturing.

14. A non-transitory machine-readable storage medium encoded with instructions executable by a processor, the machine-readable storage medium comprising instructions to:
   per layer of a multi-layer three-dimensional (3D) object to be printed:
   determine, per location, an energy absorption at that location based on an absorptivity of colored fusing agents to be deposited at that location;
   determine, per location, an additive manufacturing adjustment to be made at the location to bring the energy absorption at the location to a target level, wherein the additive manufacturing adjustment to be made to bring the energy absorption at the location to the target level includes adjusting an amount of ultraviolet (UV) absorbing agent deposited at the location based on the determined energy absorption corresponding to the absorptivity of the colored fusing agents deposited at the location; and
   form the 3D object to be printed by:
   depositing the UV absorbing agent based on the determined additive manufacturing adjustment;
   depositing the colored fusing agents;
   selectively activating sets of irradiating elements based on locations where uniquely matched colored fusing agents are deposited; and
   selectively activating a UV energy source based on locations where the UV absorbing agent is deposited.

15. The non-transitory machine-readable storage medium of claim 14, wherein:
   at least one location is to receive multiple colored fusing agents; and
   determining an energy absorption at that location is based on the absorptivity of the multiple colored fusing agents to be deposited at that location.

* * * * *